(12) United States Patent
Carpenter et al.

(10) Patent No.: US 7,809,158 B2
(45) Date of Patent: Oct. 5, 2010

(54) METHOD AND APPARATUS FOR DETECTING DOUBLES IN A SINGULATED STREAM OF FLAT ARTICLES

(75) Inventors: Michael D. Carpenter, Arlington, TX (US); Morgan Dunn, Dallas, TX (US); John J. Mampe, Palm Coast, FL (US)

(73) Assignee: Siemens Industry, Inc., Alpharetta, GA (US)

( * ) Notice: Subject to any disclaimer, the term of this patent is extended or adjusted under 35 U.S.C. 154(b) by 1150 days.

(21) Appl. No.: 11/415,883

(22) Filed: May 2, 2006

(65) Prior Publication Data

US 2006/0269102 A1 Nov. 30, 2006

Related U.S. Application Data

(60) Provisional application No. 60/676,862, filed on May 2, 2005.

(51) Int. Cl.
*G06K 9/18* (2006.01)
*G06K 9/32* (2006.01)
*G06K 9/48* (2006.01)
*H04N 7/18* (2006.01)
*B07C 5/00* (2006.01)
*G06F 7/08* (2006.01)

(52) U.S. Cl. .......... 382/101; 382/143; 382/183; 382/199; 382/295; 348/91; 348/142; 209/584; 209/900; 235/425

(58) Field of Classification Search .......... 382/101, 382/102, 103, 141, 143, 151, 154, 183, 294, 382/295, 199; 348/47, 48, 49, 50, 86, 91, 348/94, 95, 135, 142, 143; 209/576, 577, 209/583, 584, 900; 235/425
See application file for complete search history.

(56) References Cited

U.S. PATENT DOCUMENTS

| 3,868,478 A | * | 2/1975 | Zeenkov | 348/159 |
| 4,053,056 A | * | 10/1977 | Day | 209/587 |
| 4,158,835 A | * | 6/1979 | Miura et al. | 382/101 |
| 4,160,546 A | * | 7/1979 | McMillan et al. | 271/263 |
| 4,171,744 A | * | 10/1979 | Hubbard | 209/586 |
| 4,516,264 A | * | 5/1985 | Corvari et al. | 382/101 |
| 4,516,265 A | * | 5/1985 | Kizu et al. | 382/102 |
| 4,632,252 A | * | 12/1986 | Haruki et al. | 209/546 |
| 4,733,226 A | | 3/1988 | Kasuya et al. | 340/674 |
| 4,900,941 A | * | 2/1990 | Barton et al. | 250/566 |
| 4,929,843 A | * | 5/1990 | Chmielewski et al. | 250/559.05 |
| 4,972,494 A | | 11/1990 | White et al. | 382/8 |
| 4,992,649 A | * | 2/1991 | Mampe et al. | 209/546 |

(Continued)

FOREIGN PATENT DOCUMENTS

WO     WO 00/16915     3/2000

*Primary Examiner*—Matthew C Bella
*Assistant Examiner*—Anthony Mackowey

(57) ABSTRACT

A system for detection of doubles in a stream of flat items such as mail pieces being conveyed on a conveyor includes an electronic imaging camera positioned to receive an image of a side face of conveyed items over a first portion of its field of view, a reflector positioned to reflect an edge view of the items to the imaging camera, which edge view is received by the imaging camera over a second portion of its field of view, and a computer that receives image data from the camera. Program logic used by the computer determines whether the image shows one item, or more than one item.

9 Claims, 5 Drawing Sheets

U.S. PATENT DOCUMENTS

| | | | | |
|---|---|---|---|---|
| 5,065,237 A * | 11/1991 | Tsikos et al. | | 348/91 |
| 5,103,489 A * | 4/1992 | Miette | | 382/101 |
| 5,304,787 A * | 4/1994 | Wang | | 235/462.09 |
| 5,311,999 A * | 5/1994 | Malow et al. | | 209/583 |
| 5,331,151 A | 7/1994 | Cochran et al. | | 250/223 |
| 5,371,357 A * | 12/1994 | Robertson | | 250/223 R |
| 5,504,319 A | 4/1996 | Li et al. | | 235/462.08 |
| 5,534,690 A | 7/1996 | Goldenberg et al. | | 250/222.1 |
| 5,614,710 A * | 3/1997 | Mondie et al. | | 250/223 R |
| 5,675,671 A * | 10/1997 | Hayduchok et al. | | 382/296 |
| 5,697,610 A | 12/1997 | Holmes et al. | | 271/263 |
| 5,699,161 A * | 12/1997 | Woodworth | | 356/628 |
| 5,719,678 A * | 2/1998 | Reynolds et al. | | 356/627 |
| 5,737,438 A * | 4/1998 | Zlotnick et al. | | 382/101 |
| 5,755,336 A * | 5/1998 | Rudy | | 209/539 |
| 5,770,841 A * | 6/1998 | Moed et al. | | 235/375 |
| 5,803,702 A * | 9/1998 | Mullins et al. | | 414/788.7 |
| 5,841,881 A * | 11/1998 | Iwakawa et al. | | 382/101 |
| 5,894,530 A * | 4/1999 | Wilt | | 382/321 |
| 5,912,698 A * | 6/1999 | Graulich et al. | | 348/91 |
| 5,917,926 A | 6/1999 | Leverett | | 382/110 |
| 5,966,457 A * | 10/1999 | Lemelson | | 382/141 |
| 5,984,303 A * | 11/1999 | Oohara et al. | | 271/262 |
| 5,991,041 A * | 11/1999 | Woodworth | | 356/602 |
| 6,064,756 A * | 5/2000 | Beaty et al. | | 382/146 |
| 6,064,759 A * | 5/2000 | Buckley et al. | | 382/154 |
| 6,078,678 A * | 6/2000 | Gavrilos | | 382/101 |
| 6,104,427 A * | 8/2000 | Stein et al. | | 348/61 |
| 6,122,001 A * | 9/2000 | Micaletti et al. | | 348/91 |
| 6,236,735 B1 | 5/2001 | Bjorner et al. | | 382/101 |
| 6,239,397 B1 * | 5/2001 | Rosenbaum et al. | | 209/584 |
| 6,316,741 B1 * | 11/2001 | Fitzgibbons et al. | | 209/584 |
| 6,360,001 B1 * | 3/2002 | Berger et al. | | 382/101 |
| 6,370,259 B1 * | 4/2002 | Hobson et al. | | 382/101 |
| 6,377,698 B1 * | 4/2002 | Cumoli et al. | | 382/101 |
| 6,401,936 B1 * | 6/2002 | Isaacs et al. | | 209/656 |
| 6,471,044 B1 * | 10/2002 | Isaacs et al. | | 198/809 |
| 6,512,849 B1 * | 1/2003 | Yair et al. | | 382/202 |
| 6,614,928 B1 * | 9/2003 | Chung et al. | | 382/154 |
| 6,679,491 B2 | 1/2004 | Luebben et al. | | 271/150 |
| 6,728,391 B1 * | 4/2004 | Wu et al. | | 382/101 |
| 6,737,633 B2 | 5/2004 | Francke | | 250/221 |
| 6,761,352 B2 | 7/2004 | Scicluna et al. | | 271/153 |
| 6,778,683 B1 * | 8/2004 | Bonner et al. | | 382/101 |
| 6,817,610 B2 | 11/2004 | Rompe | | 271/265.04 |
| 6,823,599 B1 | 11/2004 | Minarik et al. | | 33/286 |
| 6,845,296 B2 * | 1/2005 | Ban et al. | | 700/245 |
| 6,934,413 B2 * | 8/2005 | Navon | | 382/176 |
| 6,944,324 B2 * | 9/2005 | Tran et al. | | 382/143 |
| 7,065,229 B2 * | 6/2006 | Caillon et al. | | 382/101 |
| 7,118,042 B2 * | 10/2006 | Moore et al. | | 235/462.48 |
| 7,215,363 B2 * | 5/2007 | Stamm | | 348/207.99 |
| 7,216,013 B2 * | 5/2007 | Kibbler | | 700/229 |
| 7,336,814 B2 * | 2/2008 | Boca et al. | | 382/141 |
| 7,356,162 B2 * | 4/2008 | Caillon | | 382/101 |
| 7,388,600 B2 | 6/2008 | Prudhomme et al. | | 348/92 |
| 7,446,278 B2 * | 11/2008 | Fesquet et al. | | 209/584 |
| 7,599,516 B2 * | 10/2009 | Limer et al. | | 382/100 |
| 2002/0118873 A1 * | 8/2002 | Tran et al. | | 382/143 |
| 2003/0012422 A1 * | 1/2003 | Sawai et al. | | 382/149 |
| 2003/0014376 A1 * | 1/2003 | DeWitt et al. | | 705/406 |
| 2005/0259847 A1 * | 11/2005 | Genc et al. | | 382/103 |
| 2006/0007304 A1 * | 1/2006 | Anderson | | 348/91 |
| 2007/0237356 A1 * | 10/2007 | Dwinell et al. | | 382/101 |
| 2009/0051108 A1 * | 2/2009 | Bell | | 271/264 |

* cited by examiner

METHOD AND APPARATUS FOR DETECTING DOUBLES IN A SINGULATED STREAM OF FLAT ARTICLES

This application claims priority of U.S. Provisional Patent Application Ser. No. 60/676,862, filed May 2, 2005.

TECHNICAL FIELD

The invention relates to mail processing, in particular, to a method and apparatus for capturing a composite image of flat and letter mail pieces and using the image to recognize doubles (overlapped mail pieces) in a stream of singulated mail pieces.

BACKGROUND OF THE INVENTION

In many automated mail sorting systems, stacks of flat mail pieces such as letters or flats are singulated by a feeder that advances the stack against a pickoff belt, which pickoff belt feeds individual mail pieces from the end of the stack to an opposed belt conveyor. One such feeder is disclosed in U.S. Pat. No. 6,679,491 issued Jan. 20, 2004 to Luebben et al., the contents of which are incorporated herein for all purposes. The singulated stream of mail pieces is conveyed past a scanner such as an OCR (optical character reader) or bar code reader (BCR) that captures an image of destination data from the address side of the mail piece. The image data is decoded and used to sort the mail pieces for delivery.

In order to process the large volume of mail received daily by the U.S. Postal Service, the feed rate of such feeders is normally in the thousands of mail pieces per hour. Operating at such rates, a feeder will occasionally pick off more than one mail piece from the end of the stack of mail pieces, resulting in a "double" or multiple feed where two or more overlapping mail pieces are presented to the imaging camera at the same time. Such multiple feeds result in mis-sorted mail and can also cause jams in downstream processing equipment, resulting in costly delays.

U.S. Pat. No. 6,817,610, issued Nov. 16, 2004 to Rompe, the disclosure of which is incorporated herein for all purposes, discloses a method and apparatus for detecting overlapped mail pieces as the mail pieces are conveyed on edge over a line camera which scans the bottom edges of the mail pieces. Features of the scanned image are processed using statistical techniques and compared to models of known mail piece configurations to determine the probability that the scanned image data represents overlapping mail pieces. This method relies solely on a view obtainable from the bottom of the mail pieces. There remains a need for further improvement in doubles detection in automated mail processing systems.

SUMMARY OF THE INVENTION

A system for detection of doubles in a stream of flat items such as mail pieces being conveyed on a conveyor according to the invention includes an electronic imaging camera positioned to receive an image of a side face of the conveyed items over a first region of its field of view. A reflector is positioned to reflect an edge view of the items to the imaging camera, which edge view is received by the imaging camera over a second region of its field of view. A computer receives image data from the camera and uses program logic to determine whether the image shows one item, or more than one item. A corresponding method includes the steps of creating an electronic composite image of both a side (preferably the front) of the item(s) and its edge, and then analyzing the resulting image to determine if the image shows one item or multiple items. In the composite image, the side view and edge view are preferably aligned with one another. The analysis may then proceed by identifying lines in the image which indicate the boundaries of a flat item, and using deductive rules to determine whether the lines indicate a double.

The invention further provides a computer displayable, composite image in the form of electronic data of one or more overlapping flat items being conveyed on a conveyor. Such an image comprises a first region representing a side view of the flat items, and a second region representing an edge view of the items. The first and second regions of the image are preferably on the same scale and in alignment with each other, i.e., a mail piece edge in one view should line up with the same edge in the other view. The second region of the image, representing the edge view, preferably has smaller dimensions than the first region but greater dot density than the first region. These and other aspects of the invention, which include a biaxial camera useful in the foregoing apparatus and method, are set forth in the detailed description that follows.

BRIEF DESCRIPTION OF THE DRAWINGS

In the accompanying drawings, wherein like numerals denote like elements.

DETAILED DESCRIPTION

Figure 1:
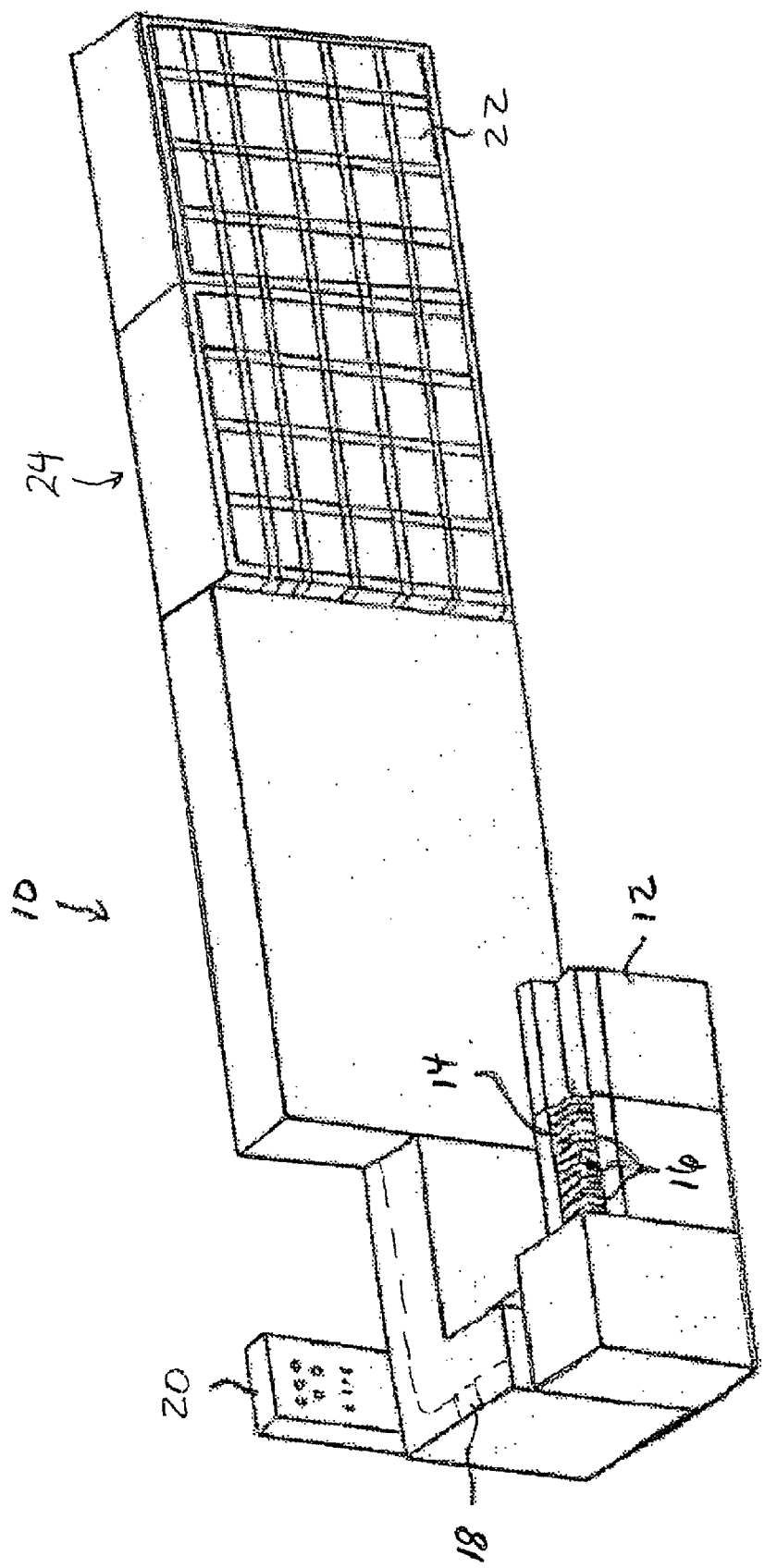
FIG. 1 is a schematic representation of a conventional mail sorting machine.

Referring now to FIG. 1, a conventional mail sorting machine 10, such as a DBCS, MLOCR or flat sorter, includes a feeder/singulator 12 where a stack 14 of mail pieces 16 are loaded on edge for sorting. The feeder mail pieces 16 are conveyed from feeder 12 as a singulated stream to a scanner or imaging camera 18, such as a bar code scanner and/or an optical character reader (OCR). Scanner 18 reads destination information from mail pieces 16 and transmits the information to a control computer 20, which stores the destination information and determines the bin 22 to which the mail piece is directed. Each mail piece is then conveyed and diverted into a selected bin 22 of a stacker section 24 based upon the destination code or read address. Wide field of view (WFOV) digital cameras have come into use as the scanner 18.

Referring now to FIGS. 2-5, in accordance with the invention, scanner 18 of FIG. 1 is replaced with an apparatus 30 for scanning flat mail pieces such as letters and flats which are being conveyed on a pinch belt conveyor. Apparatus 30 performs dual functions of scanning destination information from the mail piece and detecting multiple feeds. To perform these functions, apparatus 30 scans mail pieces 16 conveyed through the apparatus and creates a composite image that includes the address side and bottom edge of the mail piece(s) in a single plane view. The image data is analyzed to extract destination information and to determine whether the image represents a multiple feed.

Mail pieces 16 are fed to apparatus 30 one at a time by a conventional pickoff mechanism that removes the endmost mail piece from the stack 14 and feeds it into a pinch-belt conveyor 31 wherein each mail piece 16 is carried in an upright position by a pair of opposed belts 32, 36. Belts 32, 36 convey mail piece 16 to an aperture plate 38, at which time the mail piece is engaged on its front face by the aperture plate 38 and on its rear face by belt 36.

Aperture plate 38 includes a vertically elongated slot or aperture 40 to permit line scanning of mail pieces 16 conveyed past the aperture 40. A roller 44, preferably formed from a resilient foam material, presses conveyor 36 against plate 38 to pinch mail piece 16 in order to facilitate scanning and transport of the mail pieces. After scanning, mail piece 16 is conveyed away by opposed takeaway belts 34, 36, which transport the mail piece to the downstream part of the sorting machine.

One or more light sources 46 illuminate the address side 48 of mail pieces 16 passing across aperture plate 38. A light source suitable for illuminating mail pieces 16 is a light bar comprising a row of LEDs (light emitting diodes) mounted in a suitable fixture. As illustrated, a pair of light bars 46 may be provided on opposite sides of aperture 40 at acute angles relative to plate 38 in order to illuminate mail piece 16 through aperture 40 from both sides of the aperture.

Light from the address side 48 of the mail piece is received by a first barrel 50 of a biaxial electronic camera 56 positioned to one side of aperture 40 at a distance representing a sufficient depth of field. Increasing depth of field enables better resolution of the edges of overlapping mail pieces 16 where the leading or trailing edge of one mail piece 16 overlaps a second mail piece. A first region 54 (FIG. 5) of the field of view of camera 56 receives a series of images (line scans) of the mail piece 16 as it passes by aperture 40.

Figure 3:
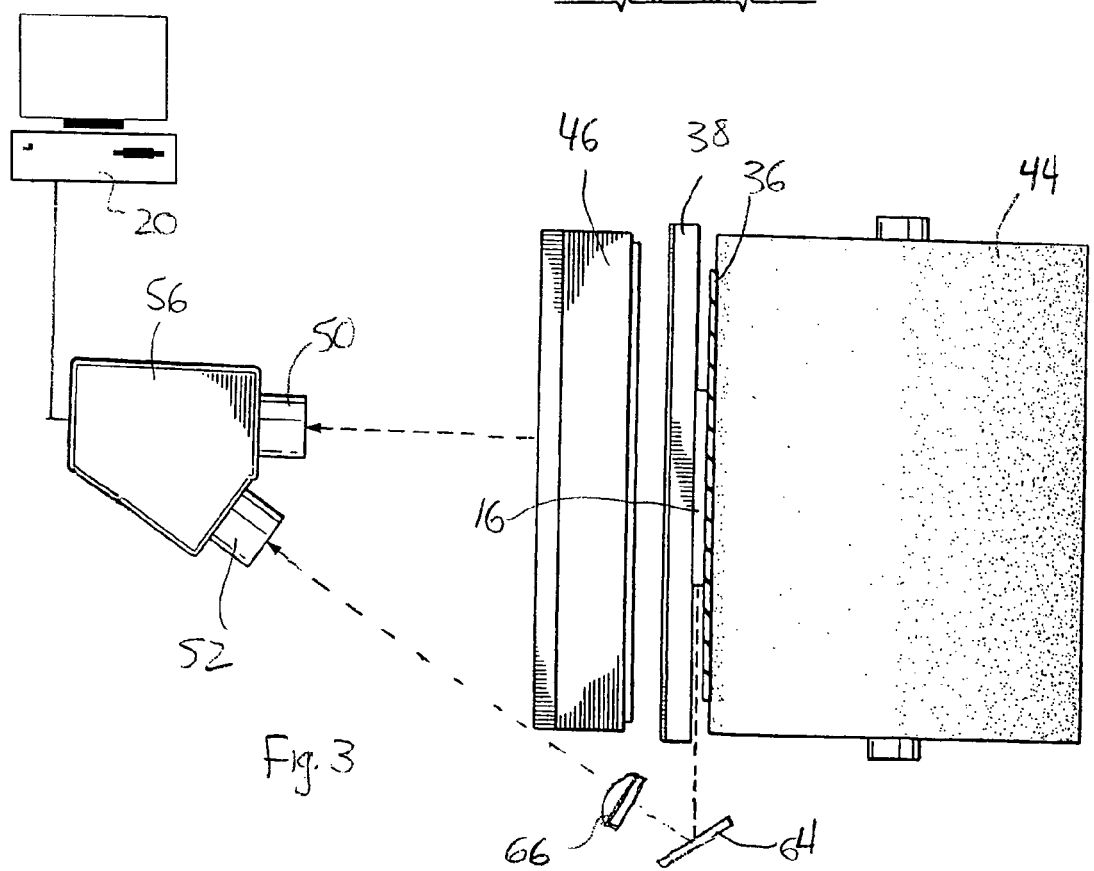
FIG. 3 is a side view of the apparatus of FIG. 2, with lower light sources omitted.
Figure 4:
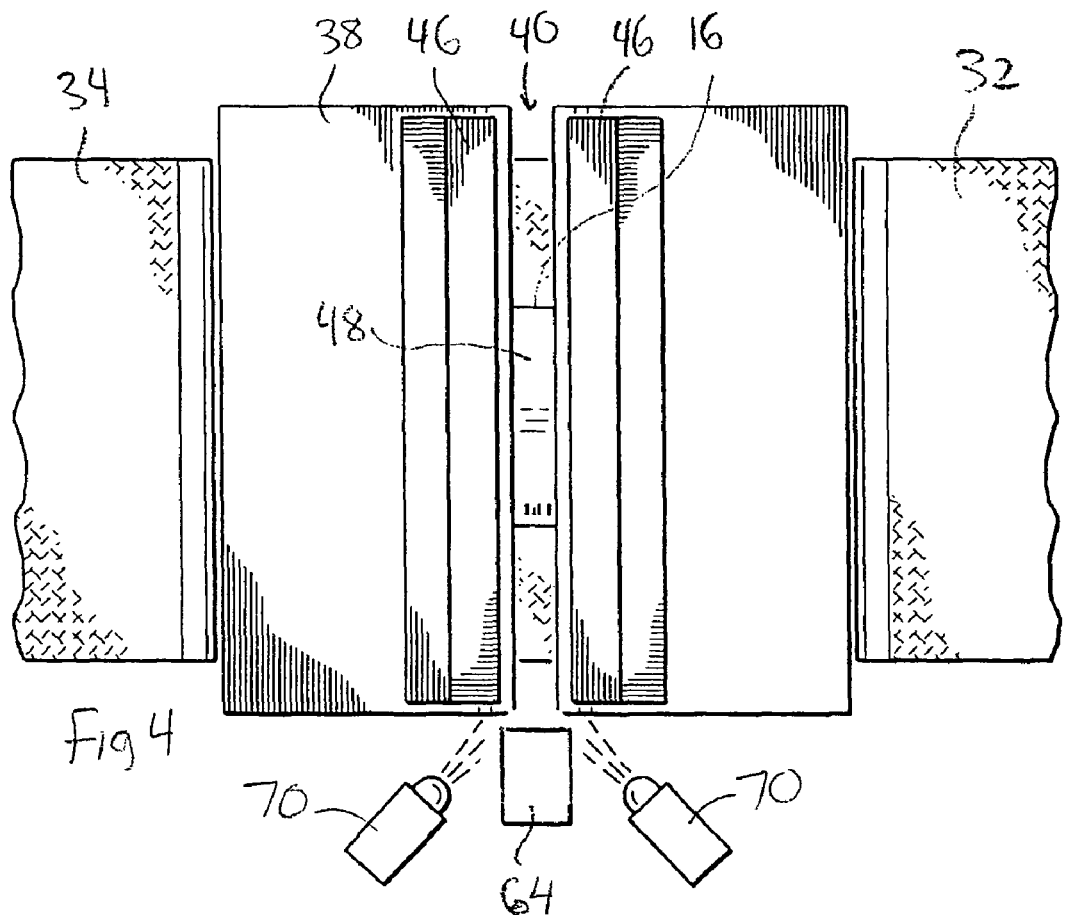
FIG. 4 is a partial front view of the apparatus of FIG. 2.

Referring to FIGS. 3 and 4, as the address side 48 of each mail piece 16 is imaged, a series of images of the bottom edge 62 of each mail piece 16 are captured from a view below and in alignment with aperture 40. A reflector such as first bottom view mirror 64 is positioned to direct light reflected from mail pieces 16 through a condensing lens 66 to a second camera barrel 52 of biaxial camera 56.

Barrel 52 is angled downwardly to receive the image of a second region 60 (FIG. 5) of the field of view of camera 56. In the example shown, second region 60 is below and adjacent to first region 54 and is aligned with it in the lengthwise direction of mail piece 16 or pieces 16A, 16B, in the case of a double.

To facilitate imaging of bottom edges 62, the mail pieces 16 are illuminated from below with one or more light sources 70. The position of light source or sources 70 is not critical. However, it may be desirable to position two upwardly directed light sources on either side of mirror 64 so that the image of the edge or edges 62 is enhanced by shadowing as disclosed in U.S. Pat. No. 6,817,610.

Electronic camera 56 thereby captures a series of linear images or line scans 58 (FIG. 5) of each mail piece 16 as the mail piece is transported across aperture 40. Each linear image 58 includes a portion of the address side 48 of mail piece 16 corresponding to first region 54 of the field of view of the camera. Each linear image also includes a corresponding section of the bottom edge 62 of mail piece 16 reflected by bottom view mirror 64 to second region 60 of the field of view of camera 56. Linear images 58 are captured in electronic form with CCDs (charge coupled devices) or similar devices in camera 56, and then combined to form a composite image that includes the address side and bottom edge of each mail piece 16. Camera 56 may be designed so that barrels 50, 52 conduct light directly to a common CCD or comparable light sensitive device. Camera 56 is preferably capable of grey scale or color imaging, and typically resolves the image of the address side 48 of mail piece 16 to 256 DPI (dots or pixels per inch), which is adequate for resolving destination information and distinguishing the ends of overlapping mail pieces. Since greater resolution helps to distinguish bottom edges 62, images of the bottom edges of mail pieces 16 are preferably resolved to a higher resolution such as 1024 DPI. Lower region 60 of the composite image thus has a greater dot density than the upper region 54, but is smaller in size and thus uses only a limited amount of camera pixel array and memory.

The recorded image data for each mail piece 16 processed through apparatus 30 is transmitted to and decoded by computer 20, which is programed with OCR and/or bar code recognition algorithms to extract destination information for mail piece 16. The destination information is used by downstream processing equipment to sort mail piece 16 to the appropriate bin 22, and may be stored to disc media or the like for later retrieval. In the event that no destination information is obtained and/or successfully decoded from the image data, the mail piece is diverted for alternate processing such as video coding.

When image data for a mail piece 16 is transmitted in electronic form from camera 56 to computer 20 for resolution of address information, the image is also analyzed to determine whether the image data represents a double. In order to analyze the image data, computer 20 is programmed with logic that analyzes the image to identify changes in the data that correspond to lines representing edges of a mail piece. The positions of the lines are then correlated to determine if the image data indicates a double.

Figure 5:
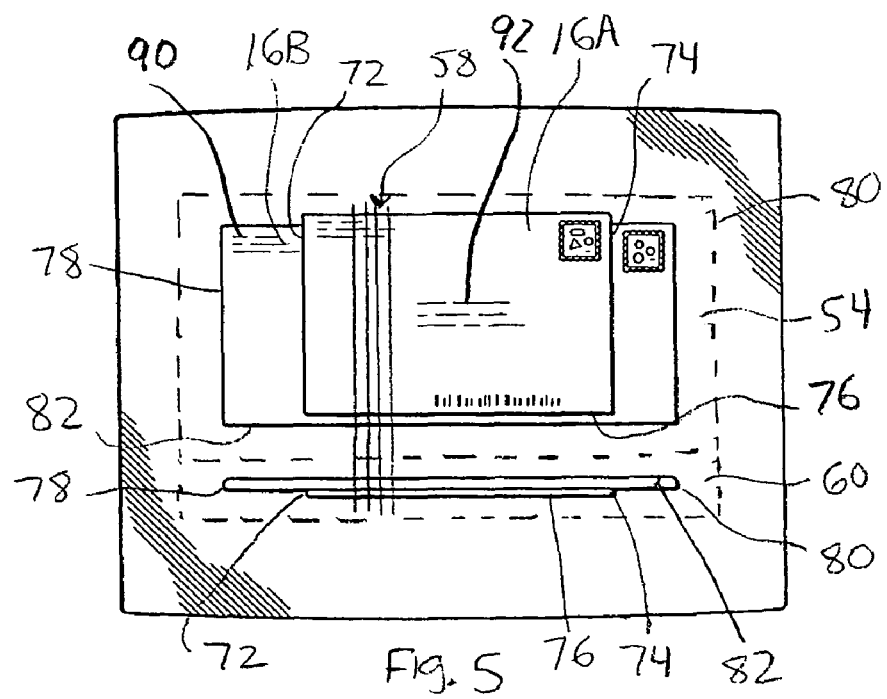
FIG. 5 is a representation of a composite image of overlapping mail pieces captured by the apparatus of FIGS. 2-5.

In the example represented in FIG. 5, first mail piece 16A has a leading edge 72, a trailing edge 74 and a bottom edge 76. Likewise, second, overlapped mail piece 16B has a leading edge 78, a trailing edge 80 and a bottom edge 82. The appearance of four "edges" (two leading and two trailing) in the first region 54 when only two edges should appear for a single mail piece is a strong indicator of a double. Similarly, the appearance of three or more lines signifying edges in the second (bottom) region 60 is indicative of a double or other abnormal feed, such as a mail piece bent in half. Computer 20 in addition determines whether leading and trailing edges 72, 74 line up in first region 54 with their counterparts at the ends of bottom edge 76 in second region 60, and whether leading and trailing edges 78, 80 line up with the ends of bottom edge 82 of mail piece 16B. If edges 72, 74 and 76 of mail piece 16A and edges 78, 80 and 82 of mail piece 16B correlate, i.e., appear in the same relative position in top and bottom regions 54, 60 of the image, there is an enhanced probability that the image represents overlapping mail pieces. In such a case, the computer signals down stream processing equipment to divert mail pieces 16A, 16B for alternate processing, such as to a reject bin 22 for re-feeding.

The program logic that correlates edges 72-82 of mail pieces 16A, 16B may be used alone or in conjunction with other program logic known in the art that analyzes only image data representing a side or sides of mail piece 16, or the bottom edges of mail pieces 16. Features processed from the first region 54 can be classified as a return address 90, an address block 92, and other indicia such as postmarks, bar codes, and the like known to those skilled in the art. Identifying multiple return addresses or indicia can be correlated with edges 72, 74, 78 and 82 to confirm a double. Similarly, the absence of multiple indicia, addresses and return addresses can identify unique mail piece construction, for example, when a mailer affixes a small envelope to a larger envelope or magazine. In this case, the program logic needs to classify the mail piece as a single item even though multiple edges appear in both image regions 54, 60.

Combining the edge correlation program logic with other doubles detect logic enhances the probability of detecting a double or multiple feed as compared to the probability of detecting a multiple feed with logic that analyzes only the sides or bottom edges of mail pieces. Further, since apparatus 30 performs the dual functions of obtaining and resolving features and destination data and detecting double feeds, the need for a separate piece of equipment to perform the doubles detect function is eliminated, permitting the system of the invention to be retrofitted to existing sorting machines. The succession of images of single and multiple mail pieces according to the invention can be stored on a hard drive or other media for later use, such as for mail pieces requiring video coding by a human operator.

Figure 2:
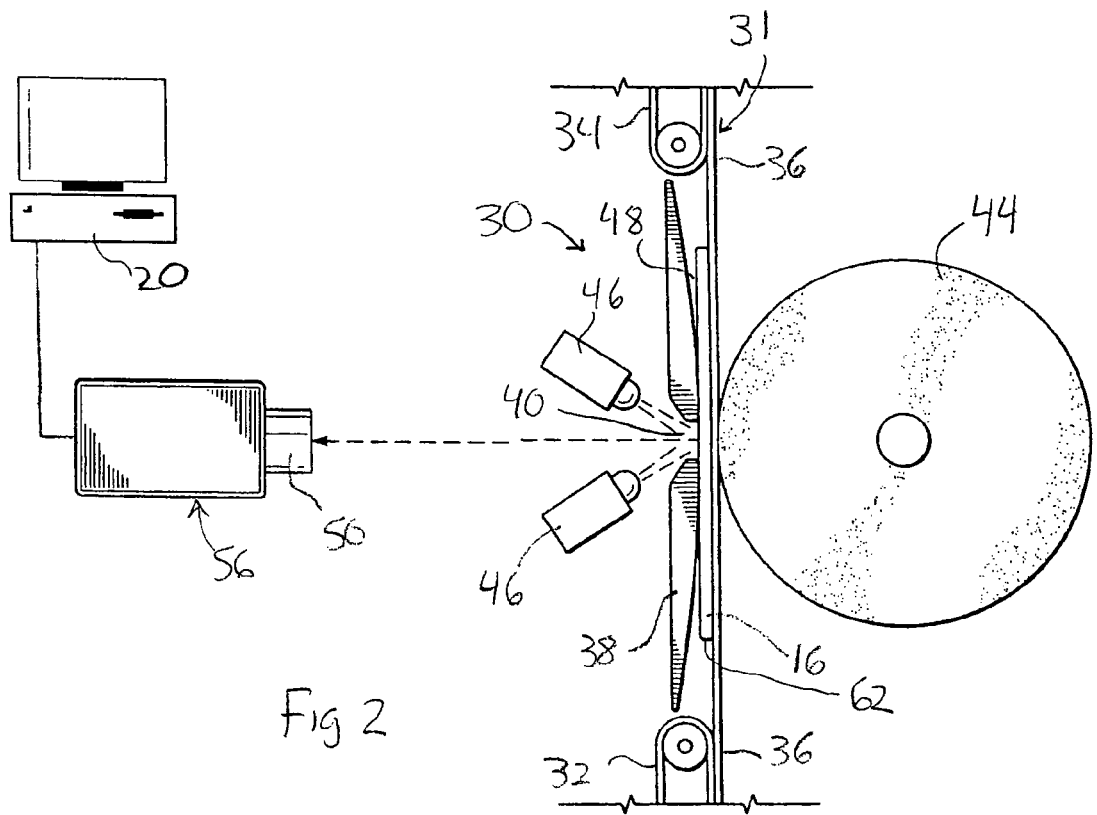
FIG. 2 is a top view of a scanning and double feed detect apparatus of the invention.
Figure 6:
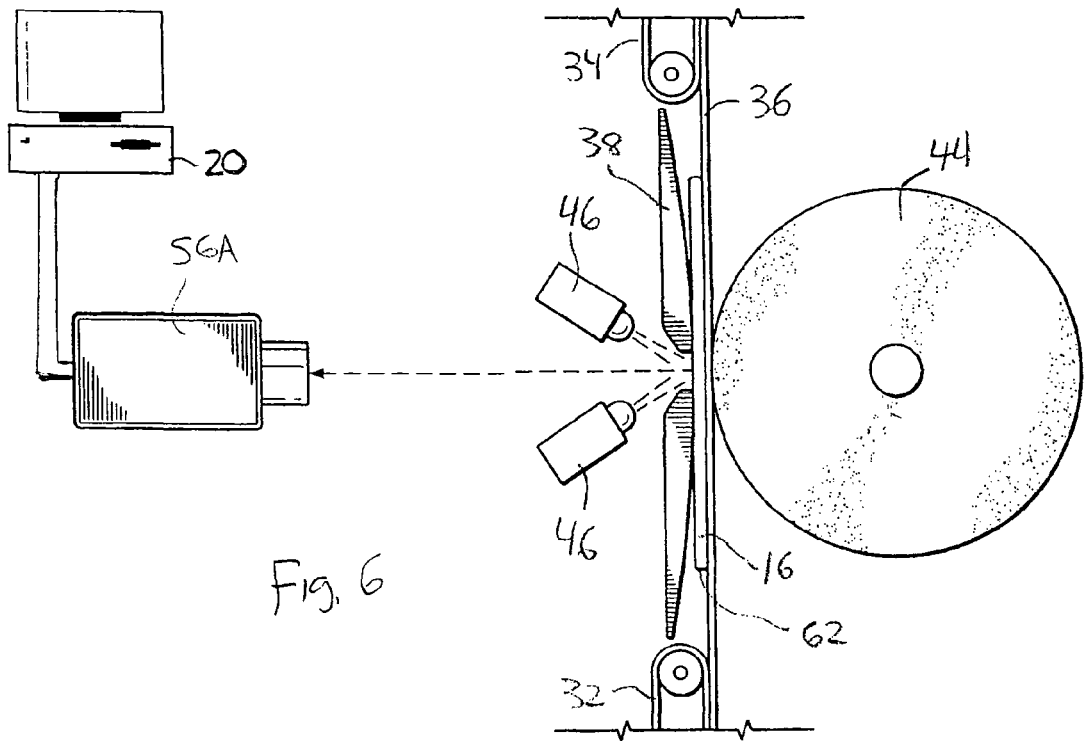
FIG. 6 is a top view of an alternative embodiment of a scanning and double feed detect apparatus of the invention.
Figure 7:
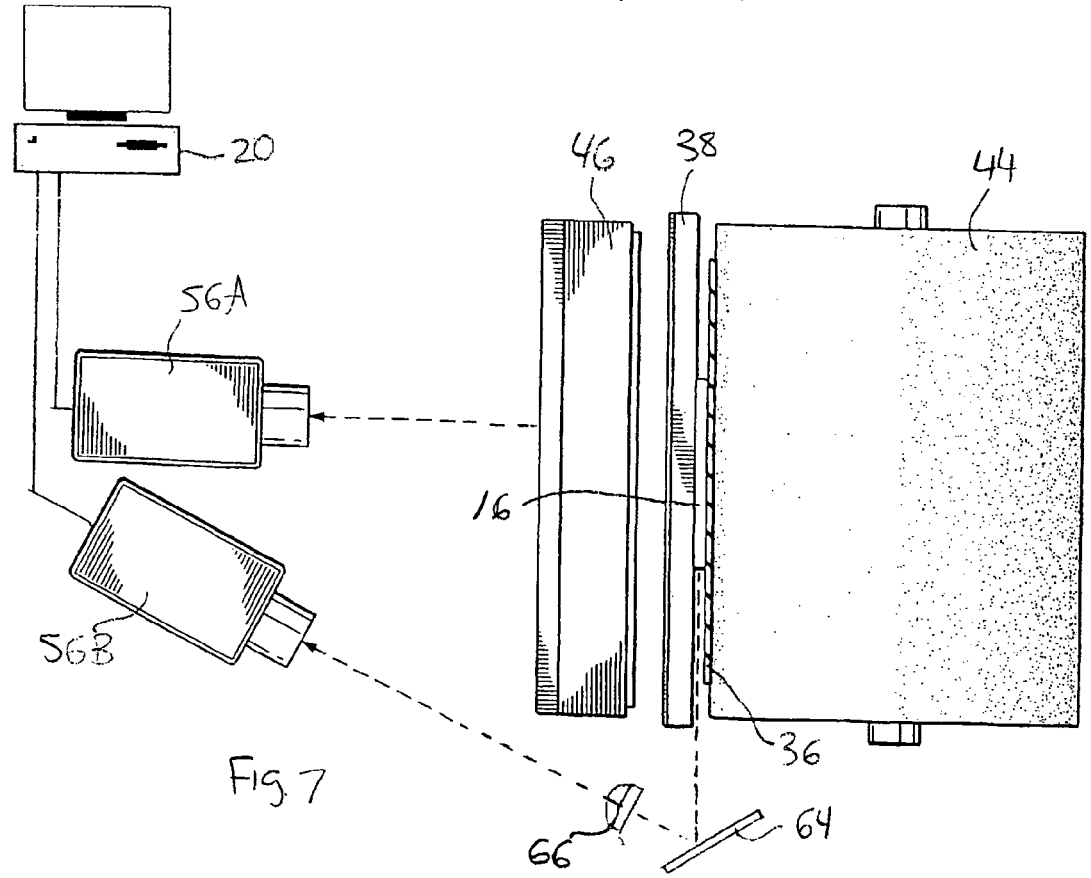
FIG. 7 is a side view of the apparatus of FIG. 6.

FIGS. 6 and 7 illustrate an alternative embodiment similar to that shown in FIGS. 2-4 wherein a pair of cameras 56A, 56B are used in place of biaxial camera 56. Lower camera 56B is directed downwardly to receive the reflected image of the lower edges of passing mail pieces 16. Combining and aligning of the image data can then be performed by software on computer 20 as each camera 56A, 56B simultaneously transmits its data to computer 20. This embodiment makes it simpler to capture lower region 60 at a higher image density, but does have the disadvantage of requiring two cameras rather than one. The "composite image" in this instance could be maintained as a pair of associated separate images or image files by computer 20, or the data could be combined into a single image or image file.

Figure 9:
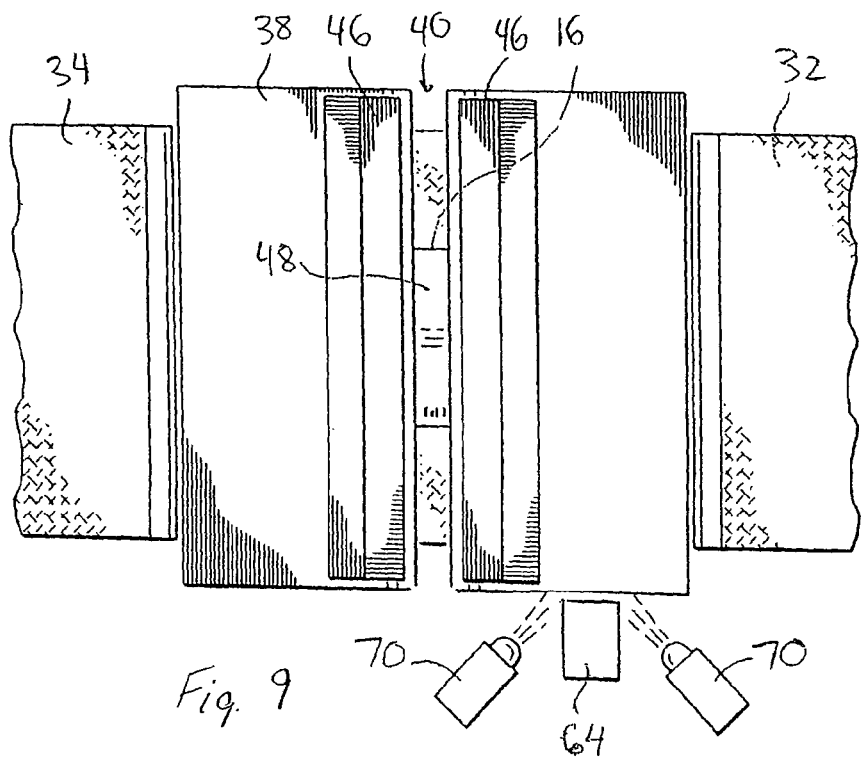
FIG. 9 is a side view of the apparatus of FIG. 8.
Figure 8:
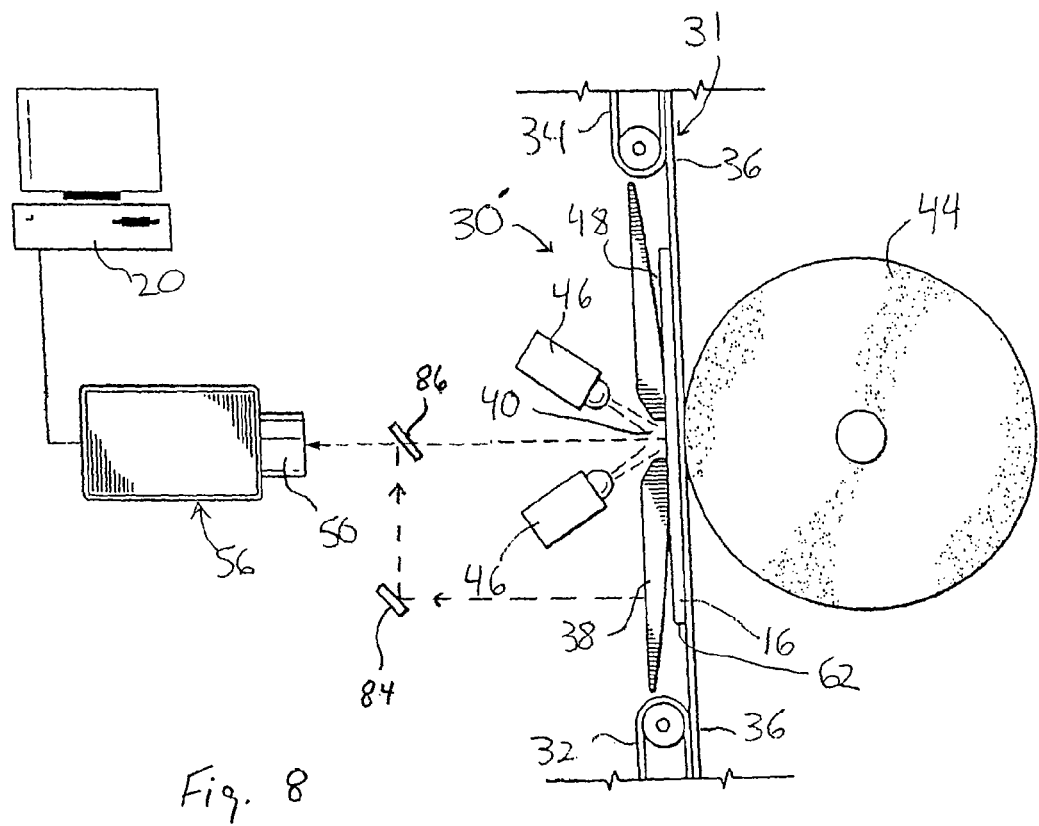
FIG. 8 is a top view of an alternate embodiment of the scanning and double detect apparatus of the invention wherein lower light sources are offset from the upper light sources.

Turning to FIGS. 8 and 9, an alternate scanning and double detect apparatus 30' is substantially identical to apparatus 30 of FIGS. 2 and 3 except that light sources 70, bottom view mirror 64 and lens 66 are horizontally offset from aperture 40. Shifting light sources 70 and bottom mirror 64 in this manner avoids possible interference resulting from alignment of light sources 70 and light bars 46. In this embodiment, second and third mirrors 84, 86 are used to compensate for the offset. Second mirror 84 is aligned with bottom view mirror 64 and angled to reflect an image of the bottom edge 62 of mail piece 16 to a third mirror 86. Third mirror 86 is aligned and angled to reflect the image to second region 60 of the field of view of camera 56.

The horizontal offset between camera 56 and mirror 64 results in the image of the address side 48 of mail piece 16 being shifted relative to the image of bottom edge 62 of the mail piece in the composite image. This shift between the image of the address side 48 and bottom edge 62 is compensated for in the program logic that processes the images. If the displacement between the two optical illumination systems is reduced from that shown in FIG. 8 and shielding is used to minimize spillover of light from the bottom illuminators to the side camera, mirrors 84, 86 could be omitted. The software correction would still be needed compensate for the horizontal shift of the bottom edge image.

While the exemplary invention has been described in connection with the exemplary embodiments it will be understood that the invention is not limited to the specific embodiments shown. For example, if space is a consideration, the imaging camera(s) can be placed closer to the conveyor line and facing away from it, and reflectors used to direct the light to the camera in order to maintain focal depth. As reflectors, prisms may be used in place of the mirrors disclosed in the foregoing description. Fiber optics can be used to conduct light to the imaging camera, especially for the edgewise view. Further, functions attributed to one or more computers may be combined or separated and accomplished using a single or multiple data processing devices incorporated into the same or different devices. "Program logic" preferably refers to software but could also be implemented as firmware or hardware. Thus, it will be appreciated by those skilled in the art that modifications and recombinations of the invention may be made without departing from the spirit and scope of the appended claims.

The invention claimed is:

1. A method of detecting doubles in a stream of flat items being conveyed on a conveyor, comprising:

conveying the flat items past at least one imaging camera;

for each flat item, using the at least one imaging camera to capture image data that includes a side view of the item and an edge view of the item;

creating a composite image from the captured image data, the composite image comprising image data of the side view and image data of the edge view, wherein the side view is aligned with the edge view of the composite image; and analyzing the composite image data with a computer that uses program logic to determine whether the composite image shows one item or more than one item by identifying data corresponding to lines representing item edges in the side view and the edge view of the composite image, and correlating the data corresponding to lines representing edges in the side view and the data corresponding to lines representing edges in the edge view to determine whether the lines indicate a single item or more than one item.

2. The method of claim 1, wherein the step of creating a composite image comprises:

capturing a series of linear images as each flat item moves past the imaging camera, each linear image including a portion of a side view of the item and a portion of a bottom view of the item, and combining the linear images to form the composite image.

3. The method of claim 1, wherein the flat items are mail pieces, further comprising a step of diverting mail pieces for re-sorting when the composite image indicates that two or more mail pieces are passing the camera at the same time.

4. The method of claim 1, wherein the flat items comprise mail pieces and the side view includes destination information, further comprising the steps of: analyzing the image data to decode destination information for the mail piece; diverting mail pieces for re-sorting when the composite image indicates that two or more mail pieces are passing the camera at the same time; and sorting a mail piece to one of plurality of destination bins based on the decoded destination information when the composite image indicates that a single mail piece is passing the camera.

5. The method of claim 1, wherein the edge view is offset from the side view, further comprising processing the composite image data using program logic to reposition the edge view to be coincident with the side view.

6. The method of claim 1, wherein the images of the side view and the edge view are provided by separate cameras.

7. The method of claim 5, wherein the images of the side view and the edge view are provided by separate cameras.

8. The method of claim 1, wherein the analyzing step further comprises determining whether one or more of multiple addresses, multiple indicium patterns, and multiple return addresses are present in the side view.

9. The method of claim 8, wherein a single destination address, indicium, and return address, and a position of the edges from the side view are used to designate a mail piece a single item even though analysis of bottom edges in the edge view indicate that multiple items are existent.

* * * * *